United States Patent

[11] 3,545,708

| [72] | Inventor | George E. Gross |
| | | Holly, Michigan |
| [21] | Appl. No. | 843,537 |
| [22] | Filed | July 22, 1969 |
| [45] | Patented | Dec. 8, 1970 |
| [73] | Assignee | Illinois Tool Works, Inc. |
| | | Chicago, Illinois |
| | | a corporation of Delaware |

[54] RETAINING CLIP DEVICE
11 Claims, 4 Drawing Figs.

[52] U.S. Cl. .................................................. 248/74,
85/32, 85/36
[51] Int. Cl. .................................................. F16l 3/02
[50] Field of Search .................................... 248/74, 73,
71; 85/32(INT), 36; 151/38—41.75

[56] References Cited
UNITED STATES PATENTS

| 2,836,215 | 5/1958 | Rapata | 151/41.75 |
| 3,074,675 | 1/1963 | Brown | 248/68 |
| 3,182,544 | 5/1965 | Rapata | 85/80 |
| 3,283,639 | 11/1966 | Holton | 85/82 |

FOREIGN PATENTS

| 969,734 | 6/1958 | Germany | 85/32 |

Primary Examiner—Chancellor E. Harris
Attorneys—Robert W. Beart, Michael Kova, Barry L. Clark and Jack R. Halvorsen ABSTRACT: Device formed of resilient plastic for supporting articles such as wires is adapted to be pressed onto a stud member having protuberances thereon such as threads for example. The device also provides a protective covering for the stud. The device includes a frustoconical body portion which surrounds a nut or other radially extending member located on the stud. The frustoconical body portion is tapered inwardly from a workpiece contacting base to a web portion which joins it to a tubular outer portion having an internal diameter slightly smaller than the outer diameter of the stud. The web portion has bellowslike segments which are resiliently compressed when the clip is pushed onto the stud and which exert a bias on the tubular portion when the device is in place against a workpiece to slightly deform the tubular portion and move it into conforming relation to the protuberances of the stud to anchor the device. An integral holding member formed on the clip permits it to support articles such as wiring harnesses.

PATENTED DEC 8 1970

3,545,708

INVENTOR  
George E. Gross  
BY Barry L. Clark  
Robert W. Beart  
His Att'ys 3,545,708

RETAINING CLIP DEVICE

BACKGROUND OF THE INVENTION

1. Field of the Invention

This invention relates to retaining clips for supporting articles from the surface of a workpiece.

2. Description of the Prior Art

Devices for supporting articles, and particularly wires or tubing, commonly called routing clips are conventionally fastened to the surfaces of the various structural members of automobiles, appliances and other devices on which they are used by means of integral fasteners which fit into holes in the structure which are especially provided for this purpose. Obviously, considerable time and expense is required to form these holes. In addition to the necessity of drilling holes to accommodate the routing clips, it is often necessary to provide extra routing clips in order to route the wires around projecting threaded studs which might interfere with the wires and damage them through vibrating in contact with them over a period of time. Sometimes, the projecting studs not only interfere with the wires to be routed past them, but also present a hazard, due to their rough surfaces, to the hands of a workman who is working near them. To prevent injury to workmen, the studs are often covered with putty or some other protective means.

SUMMARY

It is an object of this invention to provide a retaining or routing clip device which is relatively simple and economical to manufacture.

It is another object of this invention to provide a retaining or routing clip which will permit an article such as a wire to be supported on a structural member by an existing threaded stud member.

It is an additional object of this invention to provide a retaining or routing clip device which will protect and cover a threaded stud projecting from a support surface and also protect and cover an associated nut so as to prevent injuries to a person working close to the stud and nut.

These objects are obtained by the retaining clip device of the present invention which is preferably formed of a resilient plastic material such as polyethylene. The device includes a base portion adapted to engage a flat workpiece and an axially spaced web portion parallel to the base and connected to the base portion by an axially inwardly tapering frustoconical wall portion. Extending axially outwardly from the central region of the web portion is a generally tubular portion which has portions of its internal diameter of a dimension slightly less than the external diameter of the stud with which In device is to be used. The internal space within the device defined by the frustoconical wall portion and the spaced base and web portions permits the device to be placed over a nut or other fastener which may be positioned on the stud with which the device is used. In order to enable the device to be able to hold itself in firm locking engagement with the stud without the necessity of providing threads on it or rotating it, the web portion includes a series of deformations spaced from each other and formed in its inner and/or outer surfaces. In the regions of the deformations the thickness of the material of the web is less than that in the space between the deformed areas so that the deformed areas will function somewhat like a bellows and be resiliently compressed when the device is pushed onto a threaded stud. The bellowslike deformed portions will then resiliently contract into contact with the threads or other types of protuberances on the stud once the device is in its final position on the stud. Since the tubular portion has a diameter, in those areas which are axially aligned with the deformations, that is slightly less than the diameter of the threads, the cold flow characteristics of the plastic will tend, over a period of time, to cause the plastic to be formed into threads which are complementary to the stud threads. These formed threads make it very difficult to pull the retaining device off of a threaded stud after it is once pressed on. However, they readily permit the device to be unscrewed from the stud when desired.

Although the retaining clip device would have utility merely as a protective cover and sealer for a threaded stud and nut, it is preferred that a holding device be formed integrally with it to permit articles such as wires to be supported by it. The holding means is in the form of an integrally attached article-engaging member which projects axially from a portion of the base which extends radially outwardly from the frustoconical wall portion. A pair of riblike members extend outwardly toward the article-engaging member from the wall portion and cooperate with the article-engaging member to define an elongated aperture into which an article such as a wiring harness can be placed when the article-engaging member is pivoted away from the ribs so as to form an opening for entry of the article. The resiliency of the self-hinge between the article-engaging member and the base causes the member to snap over an article when released.

The foregoing and other objects, features and advantages will be apparent from the following more particular description of a preferred embodiment thereof, as illustrated in the accompanying drawings.

DESCRIPTION OF THE PREFERRED EMBODIMENT

Figure 1:
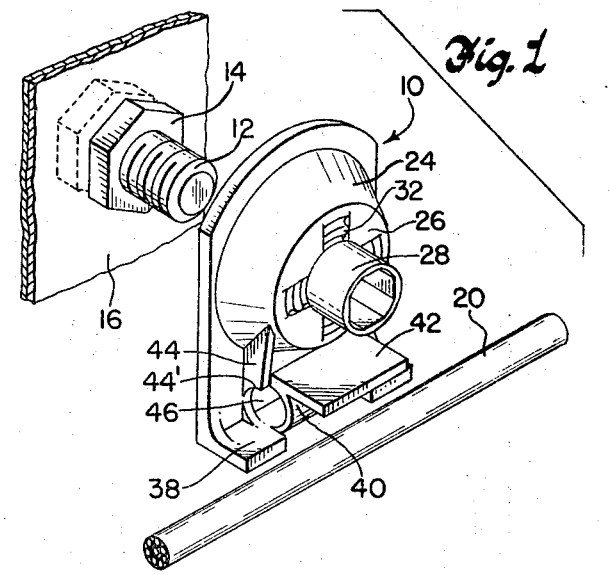
FIG. 1 is an exploded perspective view showing the retaining clip device prior to assembly of it to a threaded stud and wiring harness.

In FIG. 1 the retaining or routing clip device indicated generally at 10 is shown in exploded relationship relative to a threaded stud member 12 having a nut 14 threaded thereon and extending from a work surface 16. The FIG. also illustrates a wiring harness 20 which may be carried by the retaining clip 10 in an aperture 46.

Figure 3:
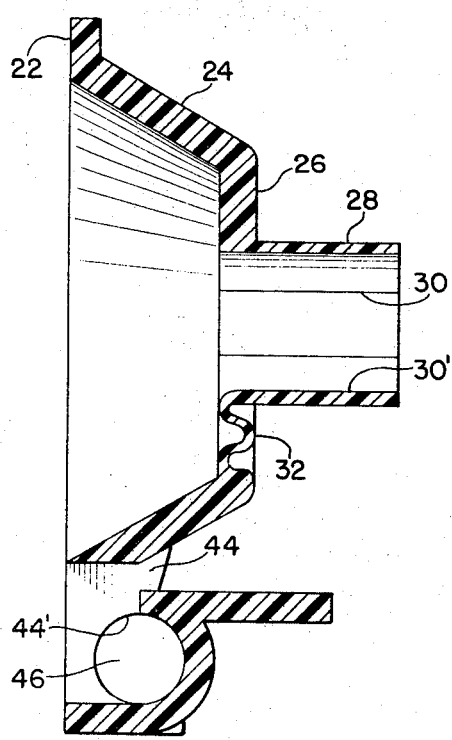
FIG. 3 is a sectional side view of the retaining clip device taken on line 3—3 of FIG. 2.
Figure 2:
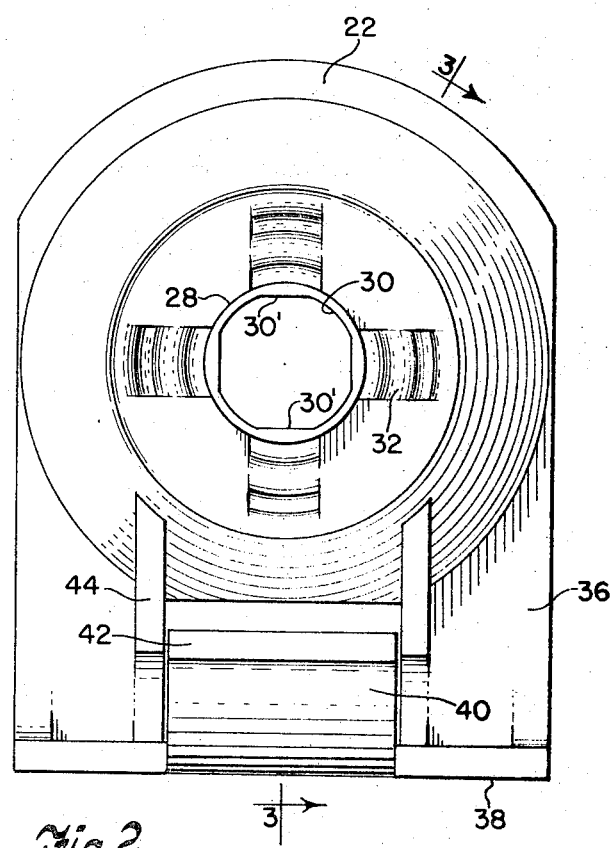
FIG. 2 is a front plan view of the retaining clip device.

As can be seen in FIGS. 2 and 3, the retaining clip 10 has a generally flat base portion 22 which is adapted to contact a work support surface 16 when the device is pressed over a threaded stud 12. The retaining clip includes a generally frustoconical wall surface 24 extending axially outwardly and radially inwardly from the base 22 and terminating in a web portion 26 which is parallel to the base 22. The web portion 26 is integrally formed with an axially outwardly extending tubular portion 28 having internal diameter portions 30 which are equal to or slightly larger in diameter than the outer diameter of the stud 12 as well as oppositely disposed flatted portions 30' which are spaced apart a distance slightly less than the outer diameter of the stud 12. Positioned at spaced intervals about the web portion 26 and in radial alignment with the flatted portions 30' are a plurality of sets of deformations 32. The deformations 32 have a corrugated or bellowslike shape which serves to absorb the radially outward movement of the flatted portions 30' as the retaining clip is pressed over a stud 12. Since the bellowslike deformations 32 resiliently absorb movement of the web they prevent stress concentrations from existing in the web which would tend to weaken the device.

Figure 4:
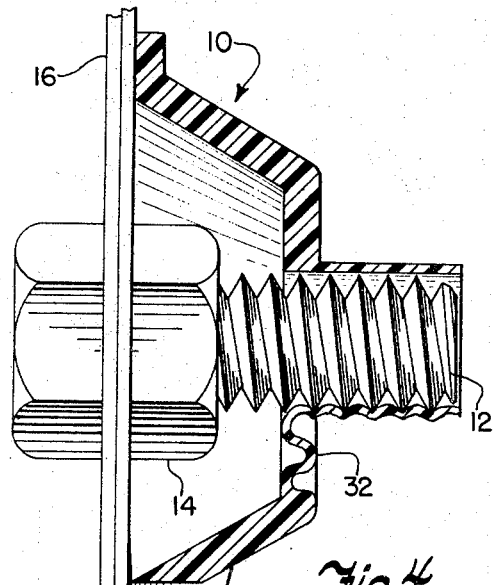
FIG. 4 is a side sectional view similar to FIG. 3 but showing the retaining clip device in operative association with a threaded stud projecting from the surface of a work panel and further showing the article holding member being manually biased to its open position for receipt of an article.

An extension 36 of the base 22 terminates in a right-angled flange portion 38 which carries an article engaging arm or member 40 having a gripping portion 42 engageable by a user. The article-engaging member 40 cooperates with the curved outer end portions 44' of a pair of integral ribs 44 to define an aperture 46 into which an article such as the wiring harness 20 can be placed. As can be seen in FIG. 4, the article-engaging member 40 can be moved away from the rib members 44 by pressure applied to the finger-gripping portion 42 when it is desired to provide access to the aperture 46 for the placement therein of an article. When finger-gripping portion 42 is released, the article-engaging member 40 will return by its inherent resilience to the normally closed position shown in FIG. 3.

Since the rib members 44 are tapered toward the aperture 46 it can be readily appreciated that they will function as guide members to guide a wire or other article into the aperture 46 when the finger-gripping member 42 is moved to the open position shown in FIG. 4.

FIG. 4 shows the retaining clip device 10 in assembled relationship relative to a stud 12 having a nut 14 threaded upon it and projecting outwardly from a work surface 16. Due to the cold flow characteristics of the resilient plastic of which the retainer clip is molded, it can be seen that the walls of the tubular portion 28 in the flatted regions 30' where the stud member 12 presses on them will tend to assume a shape complementary to the threads of the stud member 12. Because of the formation of the plastic into threads by cold flow, the retaining clip achieves a very strong fastening relationship with the stud which makes it most difficult to remove the retaining clip by pulling. The holding power of the device increases with time as the plastic continues to cold flow into the threads of the stud 12. Because threads are formed internally of the retaining clip it is possible after the initial push on assembly, to remove and replace the retaining clip on the stud by screwing it on and off like a nut while the stud member 12 has been described as a threaded member, it is obvious that it could be formed with protuberances other than threads which will cause the material of the flatted regions 30' to cold flow and produce retaining grooves complementary to the shape of the protuberances.

Although the retaining clip device has been shown with a holding means for carrying elongated articles such as wiring harnesses or tubing, it would of course be possible to apply other types of holding means such as hooks, depending upon the article to be supported. Furthermore, where one desires to cover an exposed stud and nut to prevent it from causing injury to a workman and wherein it is not desired to support an article from the stud, the retaining clip device may be modified to eliminate the article-engaging member 40.

I claim:

1. A plastic self fastening retaining clip device for use with a stud projecting outwardly from a workpiece and having protuberances on its surface comprising a base portion adapted to engage the workpiece in radially spaced surrounding relationship to the stud, a wall portion extending generally axially outwardly from said base portion and in radially spaced surrounding relationship to the stud, a web portion connecting the outer end of said wall portion to a generally tubular, outwardly axially extending hub portion having an internal dimension slightly less than the outer diameter of the stud to be engaged thereby, at least one surface of said web including at least one deformed portion therein which is radially compressible to permit said web to absorb stresses applied thereto by the pressing of said tubular hub portion onto the stud, and integral holding means on said device for holding an article.

2. The device of claim 1 wherein said web portion includes a plurality of deformed portions on said at least one surface, said plurality of deformed portions being angularly spaced from each other about said at least one surface.

3. The device of claim 2 wherein the thickness of said at least one surface is greater in the areas thereof separating said deformed portion than it is in the deformed portions.

4. The device of claim 3 wherein the material of the web comprising the deformed portions is corrugated.

5. The device of claim 1 wherein the web portion is spaced from the base portion in an axial direction and the wall portion is radially spaced from the axis of the hub portion by an amount sufficient to permit a retaining member on the stud to be enclosed by the space defined by the wall and web portions.

6. The device of claim 5 wherein the wall portion is of frustoconical shape, said wall portion being joined to the web portion at its smaller end.

7. The device of claim 1 wherein said integral holding means comprises an article engaging member integrally joined in movable relationship with an edge of said base at one end thereof and terminating at its other end in a gripping portion, said article-engaging member cooperating with at least one rib portion formed on and extending outwardly from said frustoconical wall portion to substantially surround an elongated member placed therein.

8. The device of claim 7 wherein said at least one rib portion tapers toward said article-engaging member so as to form a guide way for an elongated member moved toward engagement by said holding means when said article-engaging member is moved away from said at least one rib portion by applying pressure to said gripping portion.

9. The device of claim 1 wherein said generally tubular hub portion has a generally circular inner wall surface having a major dimension equal to or greater than the outer diameter of the stud placed therein, said generally circular inner wall surface being interrupted by at least one noncircular portion spaced from the opposing wall surface by said dimension which is slightly less than the outer diameter of the stud.

10. The device of claim 9 wherein said generally circular inner wall surface is interrupted by at least one opposed pair of flat chord portions, said chord portions being in radial alignment radial said at least one deformed portion.

11. A plastic self-fastening retaining clip device for use with a stud projecting outwardly from a workpiece and having protuberances on its surface comprising a base portion adapted to engage the workpiece in radially spaced surrounding relationship to the stud, a wall portion extending generally axially outwardly from said base portion and in radially spaced surrounding relationship to the stud, a web portion connecting the outer end of said wall portion to a generally tubular, outwardly axially extending hub portion having an internal dimension slightly less than the outer diameter of the stud, at least one surface of said web including at least one deformed portion therein which is radially compressible to permit said web to absorb stresses applied thereto by the pressing of said tubular hub portion onto the stud.